UNITED STATES PATENT OFFICE.

JOHN T. MERCER, OF RICHMOND, INDIANA, ASSIGNOR TO HIMSELF, EDWARD F. PRESTON, OF BISMARCK, MICHIGAN, AND SAMUEL C. RICHARDSON, OF TERRE HAUTE, INDIANA.

COMPOUND FOR TEMPERING STEEL.

SPECIFICATION forming part of Letters Patent No. 278,250, dated May 22, 1883.

Application filed April 18, 1883. (No specimens.)

*To all whom it may concern:*

Be it known that I, JOHN THEODORE MERCER, of Richmond, in the county of Wayne and State of Indiana, have invented a new and Improved Compound for Tempering Steel, of which the following is a full, clear, and exact description.

My compound consists of the following ingredients, combined in the proportions substantially as follows: potassæ nitras—i. e., saltpeter—eight ounces; ferro-prussiate of potassa—i. e., yellow prussiate of potash—eight ounces; hydrochlorate of ammonia—i. e., sal-ammoniac—four ounces; ferri carbonas—i. e., carbonate of iron—eight ounces; cimolia purpurescens—i. e., fuller's earth—eight ounces; chloride of sodium—i. e., common salt—one pound; water, (soft preferable,) ten gallons, more or less, according to the desired strength of the compound. These ingredients are to be thoroughly mixed and the mixture then allowed to stand about twelve hours before using. The solution is used the same as and in lieu of water for tempering steel.

The steel, tool, or implement to be tempered is heated to the desired degree and then immersed in the solution. If the temper is too hard for the purpose desired, it is drawn to color-indications in the usual way.

This solution arrests the decarbonization of steel. It closes the pores firmly without cracking or flawing the steel, and secures a thorough cementation of the granules, giving it a superior density. It so toughens steel implements tempered in it that their power of resistance under strain is greatly increased. It gives to edge-tools of all descriptions, in consequence of improved density and toughness, superior strength and smoothness of cut.

Having thus described my invention, what I claim as new, and desire to secure by Letters Patent, is—

The herein-described compound for tempering steel, consisting of potassæ nitras, ferro-prussiate of potassa, hydrochlorate of ammonia, ferri carbonas, cimolia purpurescens, chloride of sodium, and water, in the proportions substantially as set forth.

JOHN T. MERCER.

Witnesses:
THOMAS H. RIDDLE,
JOHN T. FERGUSON.